United States Patent [19]
Kudo et al.

[11] Patent Number: 5,295,897
[45] Date of Patent: Mar. 22, 1994

[54] FISH FIN REMOVER

[75] Inventors: Nobuo Kudo; Tadashi Hikio, both of Wakayama, Japan

[73] Assignee: Marucho Shokuhin Kako Kabushiki Kaisha, Wakayama, Japan

[21] Appl. No.: 47,891

[22] Filed: Apr. 19, 1993

[30] Foreign Application Priority Data

Dec. 4, 1992 [JP] Japan .................................. 4-83741

[51] Int. Cl.$^5$ ............................................. A22C 25/14
[52] U.S. Cl. ..................................... 452/166; 452/71; 452/86; 30/101
[58] Field of Search ............... 452/166, 71, 83, 86, 452/102, 104, 105, 133; 30/30, 92, 93, 101, 102, 371

[56] References Cited

U.S. PATENT DOCUMENTS

| | | | |
|---|---|---|---|
| 1,192,451 | 7/1916 | Pfefferkorn | 452/133 |
| 2,753,744 | 7/1956 | Therien | 30/102 |
| 3,518,718 | 7/1970 | Barefield | 452/120 |
| 4,761,856 | 8/1988 | Ewing | 452/170 |
| 4,802,278 | 2/1989 | Vanderdoz et al. | 452/101 |
| 4,890,385 | 1/1990 | Vanderdoz et al. | 30/102 |
| 4,901,400 | 2/1990 | Karubian | 452/133 |

Primary Examiner—Willis Little
Attorney, Agent, or Firm—Edwin E. Greigg; Ronald E. Greigg

[57] ABSTRACT

A fish fin remover that is capable of guiding a fish fin to be removed through a clearance to a rotary blade without difficulty for cutting the fin at its root accurately. The fish fin remover includes a guide frame having a step which allows the circumferential edge of the rotary blade to be accommodated in the guide frame so that the bottom of the guide frame across the clearance of the guide frame is substantially on a level with the lower surface of the rotary blade.

2 Claims, 4 Drawing Sheets

FISH FIN REMOVER

BACKGROUND OF THE INVENTION

The present invention relates to a fish fin remover for cutting off a fin of a fish.

Commonly in the fish food industry, each fin of a fish is removed by lifting the fin up, with one hand of the operator and removing the fin with a knife in the other hand.

This procedure is thus troublesome, in which the location of cutting is unpredictable and not always the same. Hence, it will be much difficulty to have a clean cutting at the root of the fin.

In view of the foregoing, it is an object of the present invention to provide a fish fin remover capable of guiding a fish fin to a rotary blade without difficulty and cutting the fin precisely at the root.

SUMMARY OF THE INVENTION

As depicted hereinafter, a fish fin remover according to the present invention comprises a main structure containing a rotary driving means and a rotary shaft which extends outward from the main structure and is driven by the rotary driving means. A rotary blade mounted onto the rotary shaft of the main structure, and a guide frame arranged extending throughout the circumferential edge of the rotary blade so as to cover the upper surface of the rotary blade and having an open clearance for permitting a fish fin to pass. In particular, the guide frame has a step provided in the inside wall thereof for allowing the circumferential edge of the rotary blade to be accommodated inside the guide frame so that the lower surface of the rotary blade is on substantially a level with the bottom of the guide frame at least on both sides of the clearance through which the fin passes.

Also as depicted hereinafter, a fish fin remover according to the present invention comprises a main structure containing a rotary driving means and a rotary shaft which extends outward from the main structure and is driven by the rotary driving means. A rotary blade is mounted onto the rotary shaft of the main structure, and a guide frame is arranged extending throughout the circumferential edge of the rotary blade so as to cover the upper edge, and has an open clearance for permitting a fish fin to pass. The guide frame has an outwardly extending guide plate provided on one end thereof adjoining the clearance through which the fin passes.

The fish fin remover of the present invention comprises a main structure containing a rotary driving means and a rotary shaft which extends outward from the main structure and is driven by the rotary driving means, a rotary blade mounted onto the rotary shaft of the main structure, and a guide frame arranged extending throughout the circumferential edge of the rotary blade so as to cover the edge from an upper side and having an open clearance for permitting a fish fin to pass. Accordingly, the fin of a fish to be removed can be cut with a front portion of the rotary blade located in the fin pass clearance as the fish moves into the fin pass clearance. The fish fin will be cut off completely after having passed the fin pass clearance.

As understood, the guide frame of the fish fin remover depicted herein has a step provided in the inside wall thereof for allowing the circumferential edge of the rotary blade to be accommodated inside the guide frame so that the lower surface of the rotary blade becomes substantially on a level with the bottom of the guide frame at least on both sides of the fin pass clearance. In guide action, as the guide frame is advanced with its bottom directly on the back of a fish, the front portion of the rotary blade located in the fin pass clearance meets the root of the fin to be removed. Accordingly, the fin can be accurately cut off at the root.

In addition, the rotary blade remains not lower than the bottom of the guide frame during cutting. This allows the rotary blade not to move into the back of the fish when the guide frame runs directly along the back of the fish. Hence, the fish itself will be free from injury while its fin being cut off appropriately.

The guide frame depicted herein has an outwardly extending guide plate provided on one end thereof adjoining the fin pass clearance. In action, the fish fin to be removed is guided securely with the guide plate to the rotary blade before being cut off. As the result, the feeding of the fish fin into the fin pass clearance will be executed easily without requiring a precise guiding control.

DETAILED DESCRIPTION OF THE PREFERRED EMBODIMENT

Figure 1:
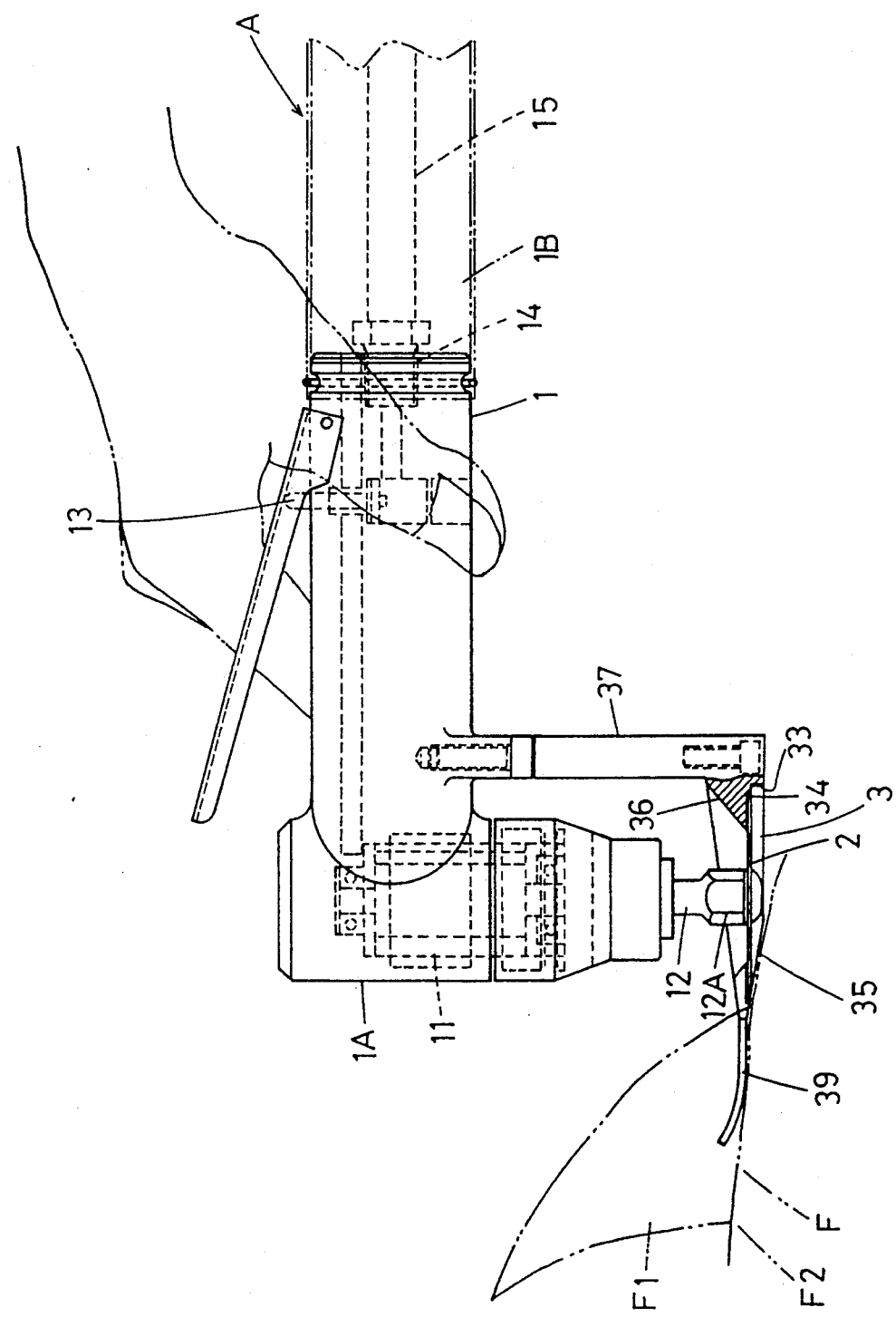
FIG. 1 is a partially cutoff front view of a fish fin remover showing an embodiment of the present invention.
Figure 2:
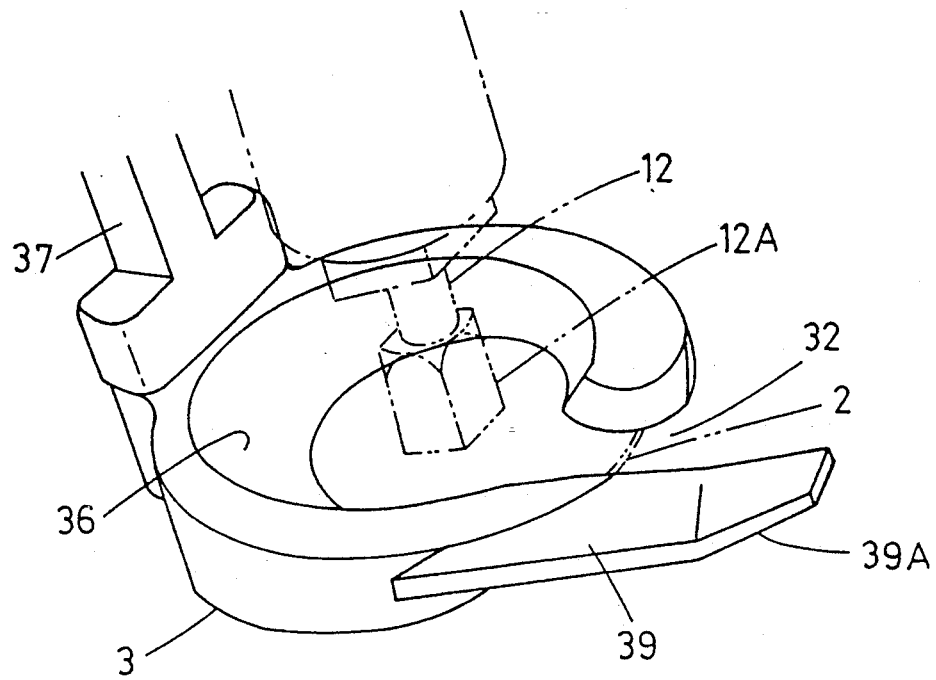
FIG. 2 is a perspective view of a guide frame, seen from upper, of the fish fin remover of the present invention.

A fish fin remover denoted by the letter A comprises a main structure 1, a circular saw blade 2 (rotary blade), and a guide frame 3.

The main structure 1 contains a water-powered turbine 11 (rotating means) which has a rotary shaft 2 extending downward from a head 1A of the main structure 1.

The water-powered turbine 11 which acts as a rotating means in the main structure 1 may be replaced with any other turbine device, an electric motor, or the like.

The main structure 1 has a body 1B carrying a switch 13, and a water intake 14 provided in the rear end thereof for supply of the turbine driving water. The water intake 14 is coupled to a water supply conduit 15.

The circular saw blade 2 is detachably mounted to the rotary shaft 12 of the main structure 1.

The rotary shaft 12 has a front end 12A arranged in a hexagonal shape in cross section.

The guide frame 3 has an annular shape which is greater in outer diameter than the circular saw blade 2 so that the guide frame can cover the circumferential edge of the circular saw blade 2 from above. The guide frame 3 is hence provided at the center with a rotary shaft opening 31.

Also, the guide frame 3 has a fin pass clearance 32 provided at the front end thereof.

Figure 3:
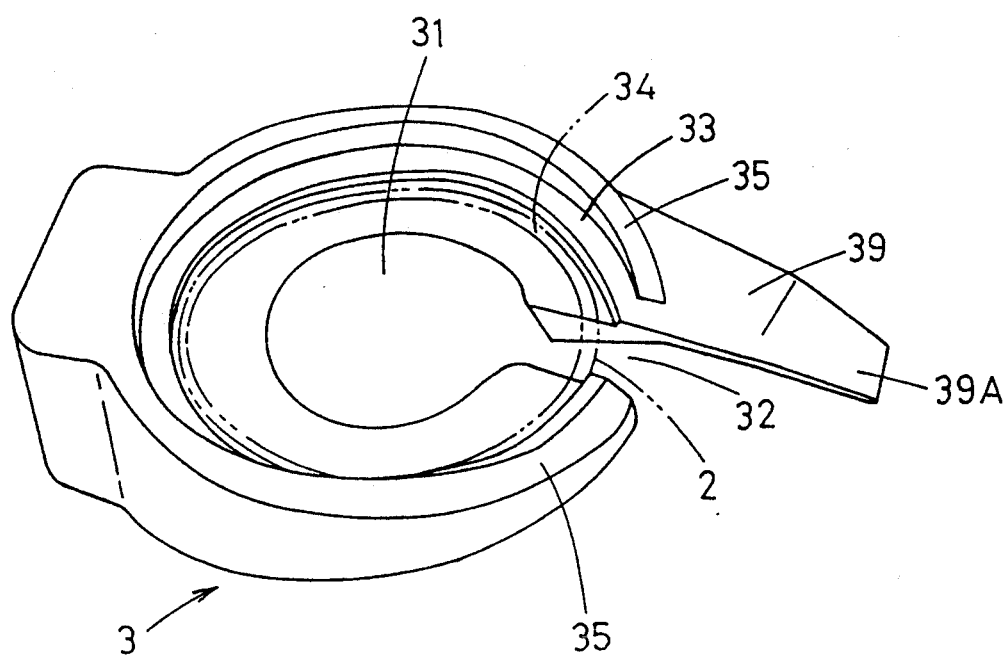
FIG. 3 is a perspective view of the guide frame, seen from below the fish fin remover of the present invention.
Figure 4:
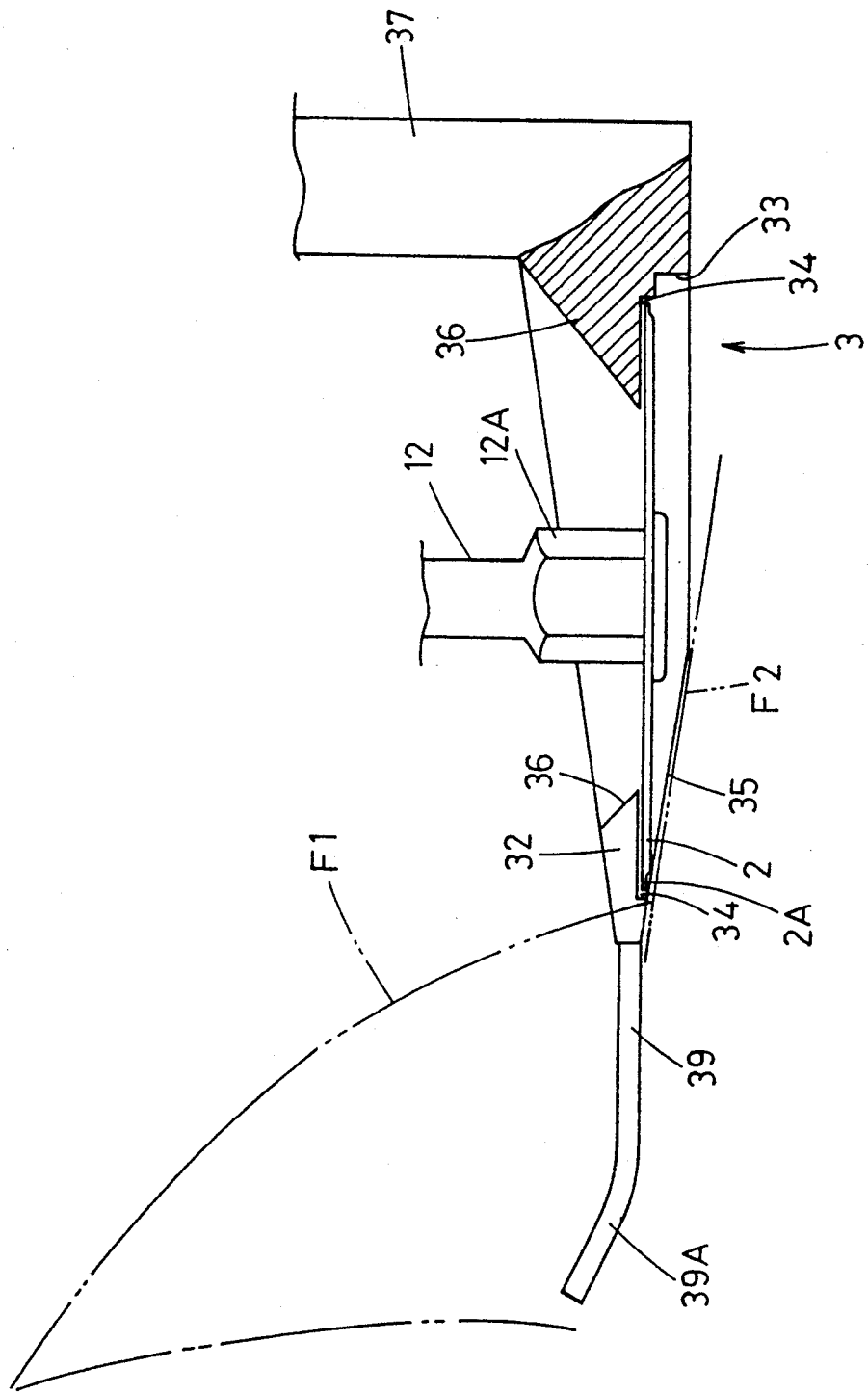
FIG. 4 is a partially cutoff front view illustrating an action of the fish fin remover of the present invention.
Figure 5:
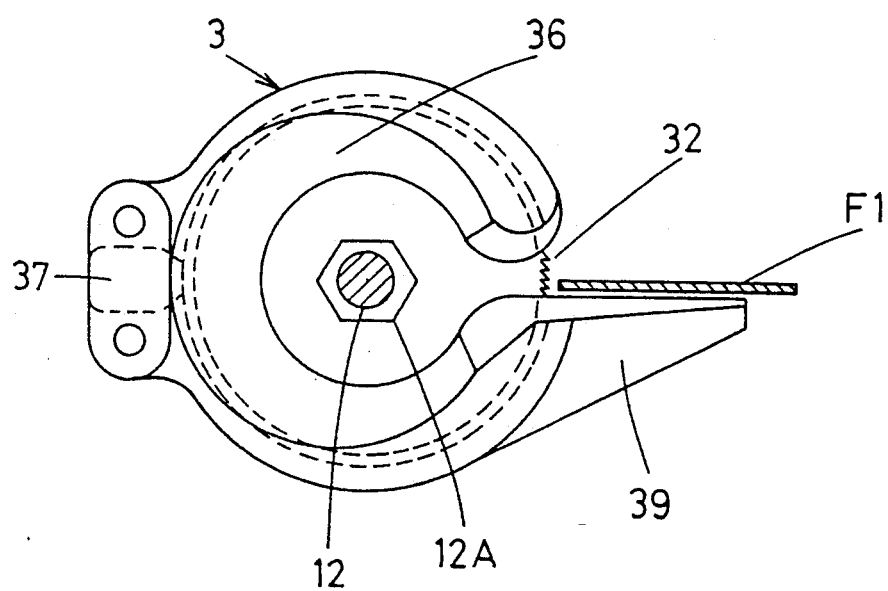
FIG. 5 is a plan view showing another action of the fish fin remover of the present invention.

The guide frame 3 has two steps 33, 34 arranged in the lower portion thereof to extend annually throughout the guide frame 3 (See FIGS. 1, 3, and 4).

The second step 34, from the bottom, of the guide frame 3 is arranged to allow the circular saw blade 2 to be accommodated therein.

The frontward bottom of the guide frame 3 incorporates a slope 35 tapered towards the fin pass clearance 32. The slope 35 causes the first step 33 to become lower towards both ends adjoining the fin pass clearance 32 so that there is no step adjacent to the fin pass clearance 32.

As the slope 35 terminates at the second step 34 on both ends of the fin pass clearance 32, the lower surface or bottom of the guide frame 3 at the fin pass clearance 32 becomes substantially on a level with the circular saw blade 2 (FIG. 1).

A guide plate 39 extends outward from one end, adjoining the fin pass clearance, of the annular guide frame 3 and has a distal end 39A thereof tilting upward.

The inside wall 36 of the guide frame 3 is sloped down towards the center opening 31.

The proximal end of the guide frame 3 is mounted by a vertical extending mounting member 37 to the body 1B of the main structure 1.

The action of the fish fin remover having the foregoing arrangement will now be explained.

First, the switch 13 on the main structure 1 is turned on to start the rotation of the circular saw blade 2.

Then, the guide plate 39 is applied at a side edge to the fin F1 of a fish F to be removed. Simultaneously, the slope 35 of the guide frame 3 is held in direct contact with the back F2 of the fish F so that a front portion 2A of the circular saw blade 2 crosses the fin pass clearance 32 faces the root of the fin F1 (FIG. 1).

While the fish F remains in a stationary position, the fish fin remover A is advanced directly along the back F2 of the fish F with the side edge of the guide plate 39 of its guide frame 3 traveling along the fin F1 until the fin F1 is cut off at the root.

Although the guide frame 3 of the fish fin remover A is slightly pressed down against the back F2 of the fish F for ease of movement during the cutting of the fin Fl, the circular saw blade 2 never cuts into the back F2 of the fish F. This action is assured by the fact that the circular saw blade 2 remains not lower than the bottom of the guide frame 3 and more specifically, its lower side is on substantially a level with the same.

Accordingly, the fish fin remover A will never cut into the back F2 of the fish F during the fin cutting even if the fish F has a planer back, e.g. a cod.

The fin F1 removed by cutting is then contacted by a corner edge of the hexagonal front end 12A of the rotary shaft 12 and discharged smoothly to the outside as moving diagonally along the sloped inside wall 36 of the guide frame 3. This allows the cutoff fin F1 to hardly remain in the guide frame 3, thus increasing the efficiency of the cutting.

Also, splashing of water from the fish F associated with the rotation of the circular saw blade 2 will be prevented by means of the step 33.

In case of breakage of the circular saw blade 2, the wall of the step 33 will prevent escape of any broken pieces of the same thus ensuring higher safety in the cutting.

The front end 12A of the rotary shaft 12 is shaped into a hexagonal form in cross section.

Although the guide frame 3 in the above embodiment of the present invention has the two steps 33, 34 and the guide plate 39, it may be provided without the two steps 33, 34 nor guide plate 39.

What is claimed is:

1. A fish fin remover comprising:
    a main structure containing a rotary driving means and a rotary shaft which extends outward from the main structure, said rotary shaft is driven by the rotary driving means;
    a rotary blade mounted onto the rotary shaft of the main structure; and
    a guide frame arranged extending throughout the circumferential edge of the rotary blade so as to cover the edge of the rotary blade from the upper edge, said guide frame having a gap clearance for permitting a fish fin to pass, said guide frame having a step provided in an inside wall thereof for allowing the circumferential edge of the rotary blade to be accommodated inside the guide frame so that the lower surface of the rotary blade is on substantially a level with a bottom of the guide frame at least on both sides of the fin pass clearance.

2. A fish fin remover comprising:
    a main structure containing a rotary driving means and a rotary shaft which extends outward from the main structure, said rotary shaft is driven by the rotary driving means;
    a rotary blade mounted onto the rotary shaft of the main structure; and
    a guide frame arranged extending throughout the circumferential edge of the rotary blade so as to cover said rotary blade from the upper edge, said guide frame having an open clearance for permitting a fish fin to pass, and said guide frame includes an outwardly extending guide plate provided on one end thereof adjoining the fin pass clearance.

* * * * *